INVENTOR
PAUL H. GIROUX
BY Paul D. Carmichael
ATTORNEY

Jan. 26, 1965 P. H. GIROUX 3,167,646

APPARATUS FOR PROCESSING DATA INCLUDING AN INSTRUCTION AND MULTIPLICAND-DIVISOR REGISTER EMPLOYED ON A TIME SHARED BASIS

Filed March 31, 1961 7 Sheets-Sheet 2

Jan. 26, 1965 P. H. GIROUX 3,167,646

APPARATUS FOR PROCESSING DATA INCLUDING AN INSTRUCTION AND MULTIPLICAND-DIVISOR REGISTER EMPLOYED ON A TIME SHARED BASIS

Filed March 31, 1961 7 Sheets-Sheet 5

Jan. 26, 1965 P. H. GIROUX 3,167,646

APPARATUS FOR PROCESSING DATA INCLUDING AN INSTRUCTION AND MULTIPLICAND-DIVISOR REGISTER EMPLOYED ON A TIME SHARED BASIS

Filed March 31, 1961 7 Sheets-Sheet 6

Jan. 26, 1965 P. H. GIROUX 3,167,646

APPARATUS FOR PROCESSING DATA INCLUDING AN INSTRUCTION AND MULTIPLICAND-DIVISOR REGISTER EMPLOYED ON A TIME SHARED BASIS

Filed March 31, 1961 7 Sheets-Sheet 7

3,167,646
Patented Jan. 26, 1965

3,167,646

APPARATUS FOR PROCESSING DATA INCLUDING AN INSTRUCTION AND MULTIPLICAND-DIVISOR REGISTER EMPLOYED ON A TIME SHARED BASIS

Paul H. Giroux, Endicott, N.Y., assignor to International Business Machines Corporation, New York, N.Y., a corporation of New York Filed Mar. 31, 1961, Ser. No. 99,755
13 Claims. (Cl. 235—165)

The present invention relates generally to method and apparatus for processing data and more particularly to the computer arts.

Digital computers are widely employed for processing data or information. A typical digital computer will comprise a memory for the storage of instruction and numerical data, arithmetic units for processing the data stored in the memory, timing circuits for generating timing pulses, a program control for controlling the operation of the various other functional units of the computer in accordance with the program and input-output equipment. All digital computers employ the same or equivalent functional groups although the organization and specific components thereof may vary. For example, the storage means for the memory may comprise a magnetic drum, a core matrix, electrostatic storage tubes or the like.

All digital computers comprise a number of devices capable of retaining a small portion of the aggregate information or data in the computer for a relatively short time interval. These devices perform an intermediate or temporary storage function and are known in the art as registers. In many cases, the information stored in the registers must be available periodically during such short time intervals as, for example, each word time during a certain phase of a computational cycle. Examples of such intermediate storage devices are the instruction and operation registers in the program control and the accumulator, multiplicand-divisor and multiplier-quotient registers in the arithmetic units. The usual practice is to provide a separate register for each of the intermediate storage functions required in the computer. This is true even though, in many instances, the various temporary storage functions cannot and do not occur during the same periods or phases of a computational cycle. The above suggests the use of registers on a time shared basis. The use of various computer components on a time shared basis is, of course, well-known in the art. However, in the case of registers the problem is complicated by the fact that in many instances the information must be available periodically during certain phases of the computational cycle. This is particularly true where the temporary storage functions are performed by revolvers.

A revolver comprises a track on a magnetic drum or similar magnetic storage means and read and write heads. The arrangement is such that information recorded on the track of the magnetic drum is sensed by the read head, amplified and supplied to the write head where it is again written on the drum. The time required to obtain the information stored on the drum is determined by the speed of rotation of the drum and the spacing between the read and write heads. A large amount of expensive apparatus is required to provide the relatively large number of revolvers used as registers in a digital computer.

Briefly, the present invention relates to data processing apparatus wherein a register is used on a time shared basis to provide a number of temporary storage functions and the stored information must be available periodically during certain phases of the computational cycle. During one phase of an operational cycle of a computer a first quantity is recorded by a write head on a track of a magnetic drum. A first read head periodically reads this information and supplies the same to other portions of the computer and to the write head for recording on the track. During another phase of the operational cycle a second quantity is recorded by the write head on the magnetic track in immediately following relation with respect to the first quantity. The second quantity is then read by the first read head and supplied to other portions of the computer and the write head for recording on the track. At another time in an operational cycle it may be necessary to use the first quantity again and at this time a second read head senses the first quantity. The first quantity is circulated to other portions of the computer and the write head. The first quantity is again periodically available by means of the first read head. The spacing between the first and second read heads is determined by the times during a computational cycle at which the first and second quantities must be periodically available. The first quantity may comprise the instruction word while the second quantity may be the multiplicand-divisor data which is used in multiply and divide operations. The instruction word is associated with the program control portion of the computer while the multiplicand-divisor data is used in the arithmetic units. The arrangement is such that a revolver provided with a suitable delay head serves as a register common to both the arithmetic units and the program control of a computer.

The primary or ultimate object of this invention is to provide data processing apparatus wherein a register performs temporary storage functions for a plurality of quantities and the quantities must be available periodically during certain phases of an operational cycle of a computer.

Another object of the invention is to provide data processing apparatus employing a register which is time shared between major functional units of a computer to provide temporary storage means for quantities which must be available periodically during certain phases of an operational cycle of the computer.

A further object of the invention is to provide an improved register which is adapted to temporarily store a plurality of digital quantities which must be periodically made available to the computer during predetermined time intervals of an operational cycle. This is accomplished by providing a revolver with an additional read head. The additional read head or delay read head is positioned in predetermined spaced relation with respect to the normal read head of the revolver as is required in the circulation of the information.

A further object of the invention is to provide data processing apparatus having the characteristics above described which is extremely versatile, simplified in construction and operation and utilizes a minimum of component parts.

The foregoing and other objects, features and advantages of the invention will be apparent from the following more particular description of a preferred embodiment of the invention as illustrated in the accompanying drawings.

INTRODUCTION

Figure 1:
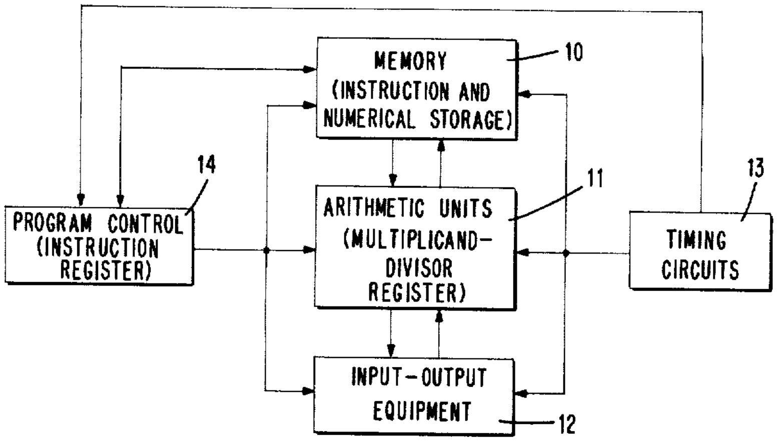
FIGURE 1 is a schematic block diagram depicting the major functional units of a computer utilizing and constructed in accordance with the teachings of the present invention.

Throughout the following description and in the accompanying drawings there are certain conventions employed which are familiar to those skilled in the art. Additional information concerning these conventions are as follows:

Bold-face characters appearing within a block symbol of a logic circuit identified the common name of the circuit represented. The reference indicium A designates a logic block performing the logical And function—no output is present from the block unless and until signals are simultaneously present on each input thereof. The symbol O designates a logic block performing the logical Or function whereby an output is present when a signal is supplied to any of the various inputs thereof. The And blocks perform Boolean multiplication while the Or blocks perform Boolean addition.

The symbol L refers to a latch while T designates a trigger. Both the latch and trigger are bistable devices which may be employed as storage elements. Each of the triggers T has a pair of output conductors, an input conductor and an inhibit conductor. A logical zero on the input conductor will set the trigger to one of its bistable states, designated as the reset state, while a logical one supplied to the input conductor will cause the trigger to change to its other bistable state, designated as the set state. Thereafter, the trigger will follow the signals on the input conductor and will remain in a condition representative of the last signal or bit supplied thereto. Each of the triggers also has an inhibit conductor which must be raised to a positive voltage level each bit time if the trigger is to function in the manner above described. If the inhibit conductor is not raised to a positive voltage level, the trigger will remain in its previous state. In most instances the inhibit conductor is not shown in the detailed logic circuits to avoid complexity and repetition in the drawings. The convention employed is that, if an inhibit conductor is not shown, the inhibt conductor is pulsed each bit time by the timing pulse CP1. The generation of this timing pulse will be hereinafter more fully described.

The latches L each have a pair of output conductors and a pair of input conductors. The latches function much the same as the triggers in that they also perform a storage function. A latch will remain in one of two stable states depending upon which of the two input conductors was last raised to a logical one voltage level.

Inverters, which perform the Boolean inversion, are designated by the symbol I. The driving function is performed by emitter followers EF. Conventional read amplifiers and write amplifiers associated with magnetic reading and writing heads are designated by the symbols RA and WA, respectively.

It will be understood by those skilled in the art that any of a number of various circuit designs can be employed in the block symbols to perform the logical functions above described. In a constructed embodiment of the invention the circuits employed operate on positive pulses with a nominal voltage level of plus fourteen volts defining the logical one and a nominal voltage of zero volts defining the logical zero.

To facilitate the understanding and description of this invention, the general arrangement of the apparatus of a preferred embodiment will first be described with respect both to the manner in which the various circuit components and the apparatus are interconnected and in respect to the general overall operation which is performed by these components and apparatus. The description of the general arrangement will be followed by separate and detailed descriptions of the various components and apparatus, which so require it, and each section of the detailed description will have a heading which indicates the apparatus about to be described.

GENERAL ARRANGEMENT

Referring now to the drawings, and initially to FIGURE 1 thereof, the present invention will perhaps best be understood by first considering the overall organization and operation of a digital computer. The computer comprises a memory 10 for the storage of various numerical, constant and instruction quantities in digital form. This memory may take the form of a rotating magnetic drum and various read and write circuits as will be hereinafter more fully described.

Also embodied in the computer are arithmetic units 11 that, in accordance with usual practice, include an adder-subtractor and various registers or similar temporary storage devices. The arithmetic units 11 perform the actual computations utilizing the quantity supplied thereto either from the memory 10 or the input-output equipment 12. The arithmetic units 11 are in communication with the input-output equipment whereby information can be transmitted from the input-output equipment to the arithmetic units and vice-versa. The input-output equipment 12 may include a processor of the general type disclosed in the co-pending U.S. patent application of Robert J. Urquhart, Serial No. 79,869, filed December 30, 1960, entitled "Method and Apparatus for Processing Data," which is assigned to the assignee of the present invention.

Timing circuits 13 are operative to generate various timing pulses which are used for control and gating functions throughout the other functional elements of the computer. The remaining functional element is a program control 14 that, in combination with the program stored in the memory and the timing pulses supplied by the timing circuits 13, determines the functioning of the computer to obtain the desired results.

The memory 10 is in communication with the arithmetic units 11 whereby information may be taken from the memory for use in the computations performed in the arithmetic units or the computed quantities from the arithmetic units may be returned to the memory for storage. As previously mentioned, the arithmetic units 11 are in communication with the input-output equipment whereby information or data can be transferred between the computer and its environment.

At this time it is appropriate to note that the program control 14 comprises an instruction register for temporarily storing instruction words commanded from the memory 10. The arithmetic units 11 employ a multiplicand-divisor register which is used during multiplication and division to store these quantities. The specific operation of the instruction and multiplicand-divisor register will be hereinafter more fully apparent.

Figure 2:
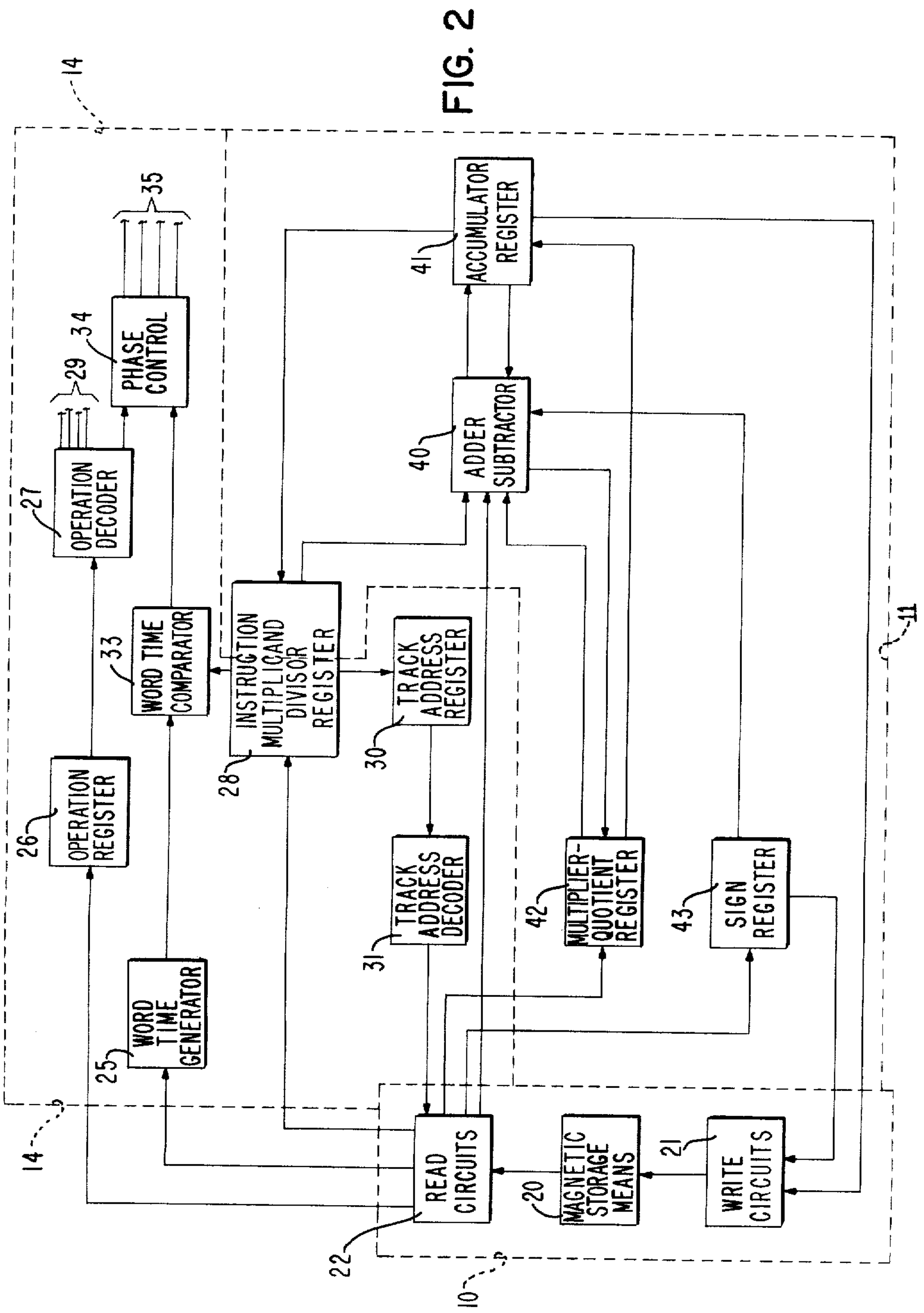
FIGURE 2 is a schematic block diagram showing the interconnection of the instruction and multiplicand-divisor register with the other functional logic elements of the memory, program control and arithmetic units of the computer.

Referring now to FIGURE 2 of the drawings, the reference numeral 20 designates magnetic storage means, such as a magnetic drum, which is adapted to retain a large quantity of information in digital form. Associated with the magnetic storage means are write circuits 21 for recording information in the magnetic storage means and read circuits 22 for retrieving information from this storage means. These components comprise the memory 10 of the computer.

The program control 14 has a word time generator 25 operative to generate a signal corresponding to each word time occurring during a revolution of the magnetic drum employed as the magnetic storage means 20. An operation register 26 and an operation decoder 27 are provided for receiving the operation portion of each instruction word and for energizing various other circuitry in the computer to accomplish the desired result. A plurality of conductors 29 lead from the operation decoder 27 and are selectively energized in accordance with the data in the operation register to condition the other elements of the computer in such a manner that they will perform the operation indicated by the operation data in the operation register 26.

The read circuits 22 of the memory are in communication with an instruction and multiplicand-divisor register 28. This register is employed on a time shared basis between the program control 14 and the arithmetic units 11 of the computer in such a manner that the stored information is available periodically during certain phases of a computational cycle. When performing as a portion of the program control 14, the instruction and multiplicand-divisor register 28 provides a temporary storage means for the instruction words coming from magnetic storage means 20 via the read circuits 22. During certain other phases of the computational cycle of the computer, the instruction and multiplicand-divisor register is adapted to receive and temporarily store the multiplicand or divisor quantity. Whether this quantity is the multiplicand or the divisor will depend upon whether the computer is performing a multiply or divide operation. During this particular phase of the operational cycle of the computer, the instruction and multiplicand-divisor register is functionally a portion of the arithmetic units 11.

One output of the instruction and multiplicand-divisor register is transmitted to the track address register 30 and track address decoder 31. The arrangement is such that during certain phases of a computational cycle, the bits in the address portions of an instruction word representing particular track locations on the magnetic drum defining the magnetic storage means 20 are transmitted to the track address register 30. The track address decoder 31 energizes appropriate ones of the read circuits 31 in response to the bits of information in the track address register 30.

The outputs of word time generator 25 and the instruction and multiplicand-divisor register 28 lead to a word time comparator 33 which, when coincidence is detected between the bits in the address portions of an instruction word and the output of word time generator 25, energizes a phase control 34. The phase control 34 has a plurality of output leads 35 extending to other elements of the computer and is operative to shift the computer from one phase to another in a sequential manner during a computational cycle of the computer. The extent and definition of these various phases of a computational cycle and the organization of the phase control 34 will be hereinafter more fully explained.

As mentioned above, the arithmetic units 11 comprise the instruction and multiplicand-divisor register which is used on a time shared basis with the program control. In addition, the arithmetic units include a full binary adder-subtractor 40, an accumulator register 41, a multiplier and quotient register 42 and a sign register 43. The added-subtractor 40 is adapted to manipulate the quantities supplied thereto from the accumulator register 41, the read circuits 22, the instruction and multiplicand-divisor register or the multiplier-quotient register in a manner determined by the operation portion of the instruction word which is in the operation register 26. The sign register 43 is utilized to store the sign bit of an information word and to set the adder-subtractor 40 in its add or subtract state in response to this sign bit.

The write circuits 21 of the memory are adapted to be energized by the sign register 43 and the accumulator register 41. The arrangement is such that a computed quantity, along with the sign information concerning the same, may be returned to the memory for storage if desired.

The magnetic storage means 20 comprises a drum 50 having a cylindrical outer surface of magnetic material susceptible to the storage of information thereon. The magnetic drum is mounted on a shaft 51 and is driven at high speed by any suitable drive means, such as motor 52, acting through power transmission means 53. In a constructed embodiment of the invention, the magnetic drum is rotated at the rate of one hundred revolutions per second. The magnetic drum 50 has a great many tracks thereon and the majority of these tracks, represented by the reference numeral 54, are used for the storage of data, instruction and constant words. Each of these tracks is divided into a plurality of individual word lengths or spaces. It will be assumed for the purposes of the following discussion that each of these tracks is divided into sixty-four word times or lengths.

The magnetic drum 50 also has a plurality of individual tracks thereon which serve as registers in the arithmetic units and the program control. The track 55 defines the instruction and multiplicand-divisor register while the track 56 provides the multiplier-quotient register. The accumulator register in the arithmetic units is provided by the track 57. An address reference track 58 is also included on the magnetic drum 50 and has sixty-four word positions or word times in the same manner as the main storage tracks 54. Each of the sixty-four word times of the address reference track 58 has a binary code written in certain bit positions thereof to correspond to the word time bits in the address portion of an instruction word. The address reference track defines a portion of the word time generator 25 and the information recorded thereon is compared with the corresponding information in the address portions of the instruction words for actuating the phase control 34.

Associated with each of the tracks on the magnetic drum is at least a pair of magnetic to electrical transducing means or heads, not particularly shown. Each pair of the magnetic to electrical transducing means comprises a read head operative to sense the magnetic condition of those portions of the tracks directly thereunder and translate the magnetic information stored on the tracks to proportional electrical signals. The remaining transducing means of each pair performs the opposite transducing function—changing electrical signals into magnetic information recorded on the drum track. These heads may be of the type shown and described in the co-pending U.S. patent application of Harry Charnetsky, Jr. and William R. Maclay, Serial No. 845,687, filed October 12, 1959, now Patent No. 3,072,752 entitled "Apparatus for Manifesting Intelligence on a Record Media," which is assigned to the assignee of the present invention.

Figure 4:
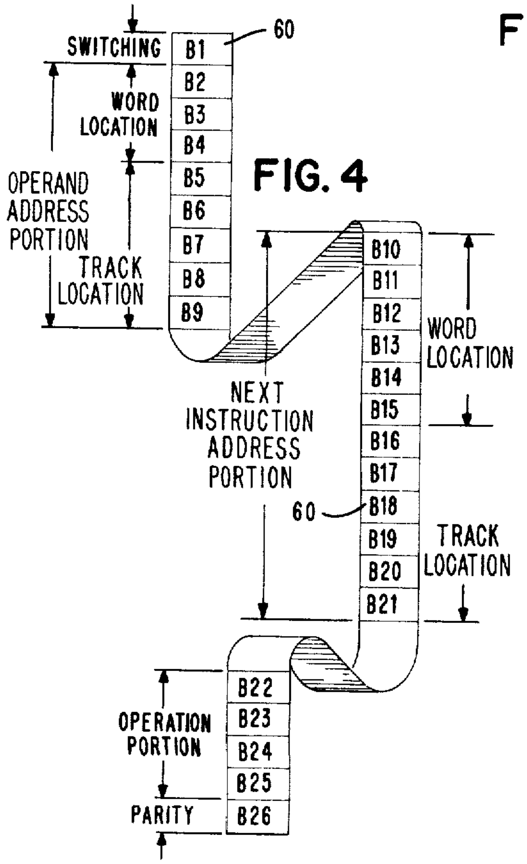
FIGURE 4 is a diagram of an instruction word as employed in the data processing apparatus.
Figure 3:
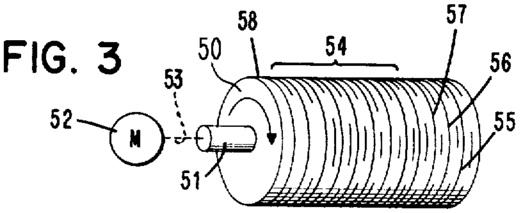
FIGURE 3 is a perspective view showing the magnetic drum used as the memory for the computer and providing tracks for a portion of the registers.

A diagram of one instruction word is shown in FIGURE 4 of the drawings and it will be noted that the same is divided into twenty-six bit portions 60. These bit portions are indicated by the reference indicium B1–B26. In the following description when, for example, a certain bit of information is said to be present in bit position nine for a given instruction word, this piece of digital information will be found in the area designated B9.

The first bit position or B1 is reserved for switching information while the parity bit is tacked on at the end of the instruction information in bit position or time B26. The parity bit is employed in a checking scheme which tests for the occurrence of non-permissible code expressions. Parity checking is well-known to those skilled in the art and, to avoid unnecessary disclosure in the specification, the circuits for accomplishing the parity check will not be described or shown.

The remaining bit times or portions (B2–B25) of an instruction word are divided into three functional information containing groups or portions. The first of these groups consists of the bit positions B2 through B9, inclusive, and is designated as the operand address portion. The second group is known as the next instruction address portion and occupies the bit positions B10 through B21. Bit positions B22 through B25 define the operation portion of an instruction word. The computer of the present invention uses a so-called one plus one address structure wherein one instruction word always specifies the location of the next instruction word.

The operand address portion of an instruction word contains information as to the position on the magnetic drum 50 of the data which is required during a particular computational cycle of the computer. The first three bits (B2–B4) of the operand address portion of the instruction word contain information pertaining to the particular word time occupied by the data while the information in bit positions or times B5–B9 designates the track of the magnetic drum. It will thus be seen that the bit times B2–B9 of an instruction word define a particular word in the magnetic storage means which, of course, corresponds to the information desired for use during a particular computational cycle.

Bit positions B10–B21 of an instruction word contain information pertaining to the location of the instruction word to be employed in the succeeding computational cycle. Bit positions B10–B15 define the word time while bit positions B16–B21 define the particular track on the magnetic drum where the next instruction word is to be found.

The operation portion of the instruction word contains the information which actually controls the functioning of the computer. It is noted that four bit positions (B22–B25) define the operation portion of an instruction word and sixteen individual combinations are possible. Of the sixteen possible combinations only ten are employed. For example, a clear and add instruction, which essentially controls the remainder of the computer to replace the contents of the accumulator register with the word located at a position in the memory defined by the operand address portion of an instruction word, may be indicated when the bits B22, B24 and B25 are all one's and the bit B23 is a zero. The ten instructions, their function and the code employed in the operation portions of the instruction words are tabulated below:

*Table 1*

| Bit Positions | | | | Title | Function |
|---|---|---|---|---|---|
| B22 | B23 | B24 | B25 | | |
| 1 | 0 | 1 | 1 | Clear and Add CAD | Replace the contents of the accumulator register with the word located in the memory at the position defined by the operand address portion of the instruction word. |
| 0 | 0 | 1 | 0 | Add ADD | Add the word located in the memory at the position defined by the operand address portion of the instruction word to the word in the accumulator register and return the sum to the accumulator register. |
| 0 | 1 | 1 | 0 | Subtract SUB | Subtract the word located in the memory at the position defined by the operand address portion of the instruction word from the word in the accumulator and place the difference in the accumulator register. |
| 1 | 1 | 1 | 0 | Multiply MPY | Multiply the word in the accumulator by the word located in the memory at the position defined by the operand address portion of the instruction word and place the product in the accumulator register. |
| 1 | 0 | 1 | 0 | Divide DIV | Divide the word in the accumulator register by the word located in the memory at the position defined by the operand address portion of the instruction register and place the quotient in the accumulator register. |
| 1 | 1 | 0 | 1 | Control Transfer CTR | If the sign of the quantity in the accumulator register is positive, go to the next instruction address portion of the instruction word for the next instruction word. If the sign is negative, go to the operand address portion of the instruction word for the next instruction word. |
| 0 | 0 | 1 | 1 | Store STO | The data contained in the accumulator register is stored in the memory at the location specified by the operand address portion of the instruction word. The data is retained in the accumulator register. |
| 0 | 1 | 0 | 1 | Shift SFT | The data contained in the accumulator register is shifted left or right one to five places according to the track bits of the operand address portion of the instruction word. |
| 1 | 1 | 1 | 1 | Input INP | Data from the input-output equipment is transferred to the accumulator register. |
| 0 | 1 | 1 | 1 | Output OUT | A quantity in the accumulator register is transmitted to the input-output equipment. |

As mentioned above, a one plus one format for the instruction word is employed whereby the location of the next instruction word is contained within the instruction word being used at any particular time. Thus, one of the phases of the computational cycle of the computer comprises looking for the new instruction word. Other of the phases of the computational cycle include the reading of the next instruction word into the instruction register, looking for the operand as determined by the operand address portion of the next instruction word and the actual computation performed in accordance with the operation address portion of the next instruction word. The four phases of a computational cycle are set forth below:

*Table 2*

| Phase Number | Operation | Word Times Required |
|---|---|---|
| Phase I | Looking for the next instruction word. | One to sixty-four word times. |
| Phase II | Reading new instruction word into the instruction register. | One word time for all computational cycles. |
| Phase III | Looking for operand as defined by the operand address portion of the new instruction word found in Phase I. | One to nine word times. |
| Phase IV | The actual computation as controlled by the operation portion of the new instruction word found in Phase I. | One word time for all operations excepting multiply and divide operations which require twenty-two additional word times. |

The various phases of a computational cycle may perhaps best be understood when considering a typical computational cycle of the computer. Such a computational cycle will be explained in connection with FIGURE 2 of the drawings and it will be assumed that a multiply operation is being performed. Prior to this operational cycle the number to be multiplied or the multiplicand has been placed in the accumulator register and the instruction word for the preceding computational cycle is in the instruction and multiplicand-divisor register 28.

During Phase I of the computational cycle bits B16–B21 of the next instruction address portion of the preceding instruction word are transmitted to the track address register 30 whereby the track address decoder 31 energizes the proper read circuits 22 corresponding to the track on which the next instruction word is recorded. At the same time the information in bit positions B10–B15 of the next instruction address portion of the preceding instruction word is being compared by the word time comparator 33 with the output of the word time generator 25. When the word time comparator 33 detects coincidence between the outputs of the word time generator and the instruction and multiplicand-divisor register 28, the phase control 34 is energized. The proper output conductors 35 are raised to an up level which places the computer in Phase II of its computational cycle.

Phase II lasts for one word time and the new instruction word which has been located during Phase I is read into the instruction and multiplicand-divisor register 28. At the same time the operation portion of this new instruction word is gated into the operation register 26 and the output conductors 29 of the operation decoder 27 are energized in accordance with the code set forth in Table 1 above to define a multiply operation. The output conductors of the operation decoder lead to the various functional components of the computer whereby the same are conditioned to perform a multiply operation. At the end of one word time the phase control 34 is operative to shift the computer into Phase III of its computational cycle.

The multiplier is obtained from the magnetic storage means 20 during Phase III of the operational cycle of the computer. To accomplish this, bits B5–B9 defining the operand address portion of the new instruction word are transferred to the track address register 30. The outputs of the track address decoder 31 energize those of the read circuits 22 which define the track on which the operand or multiplier is recorded. The information contained in bit positions B2–B4 of the new instruction word are compared with the output of word time generator 25 by the word time comparator 33. When the coincidence occurs, the multiplier is transferred to the multiplier-quotient register 42. The coincidence condition detected by the word time comparator 33 serves as an input to the phase control 34 whereby the computer shifts into Phase IV of its computational cycle.

The actual arithmetic manipulation—in this case multiplication—is performed during Phase IV. During the first word time of Phase IV the multiplicand is transferred to the instruction and multiplicand-divisor register 28. As fully explained in Chapter 5 of the book entitled "Arithmetic Operations in Digital Computers" by R. K. Richards, which was published by D. Van Nostrand Company, Inc., Princeton, New Jersey, in 1955, binary multiplication is accomplished by completing a plurality of shifting and adding operations. Each word time the multiplier is shifted to the right one bit and the least significant bit coming from the multiplier-quotient register 42 is used to determine whether or not the multiplier should be added to the partial product in the accumulator register 41. The addition is accomplished by the adder-subtractor 40. The arrangement is such that at the end of Phase IV the product to twenty significant places will be in the accumulator register 41. During Phase I of the next computational cycle the new instruction word is again required so that the succeeding instruction word may be located and read into the instruction and multiplicand-divisor register 28.

It will be noted that the register 28 is employed on a time shared basis between the program control 14 and the arithmetic units 11 of the computer for the temporary storage of instruction words and multiplicand or divisor quantities. An instruction word in the register 28 must be available periodically during Phase I of the computational cycle to permit comparison of the bits defining the word time locations of the new instruction word with the output of a word time generator 25. The new instruction word is read into the register 28 during Phase II and must be available each word time during Phase I of the succeeding computational cycle. The multiplicand or divisor in the instruction and multiplicand-divisor register 28 must be cyclically available each word time during Phase IV of the computational cycle. The register 28 functions as a temporary storage means for a plurality of quantities on a time shared basis and these quantities must be periodically available during the various phases of the computational cycles.

Figure 6:
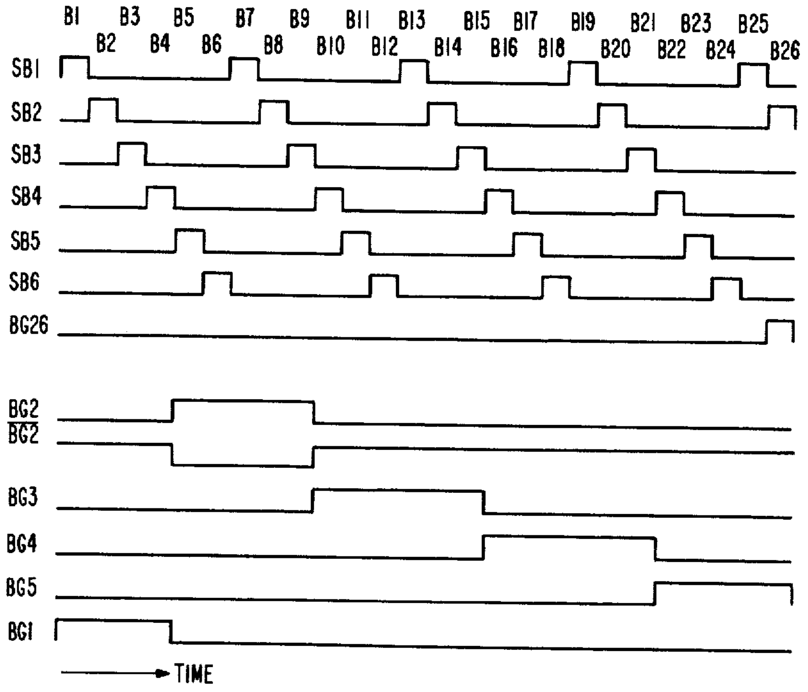
FIGURES 5 and 6 are timing charts showing the various timing pulses or signals generated by the timing circuits of the computer.
Figure 5:
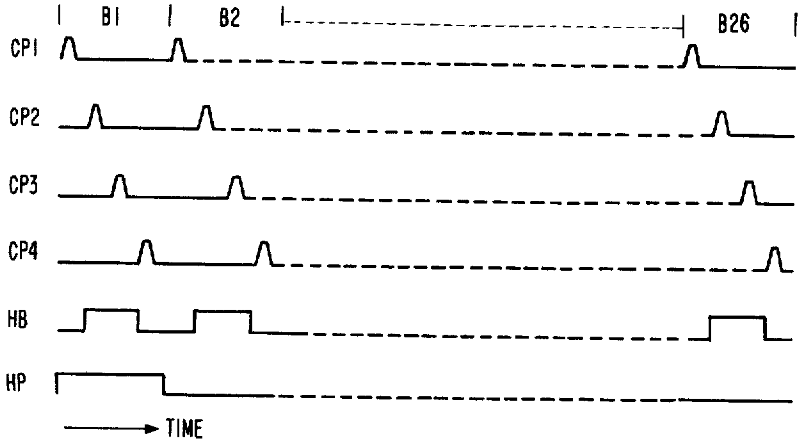
Figure 7:
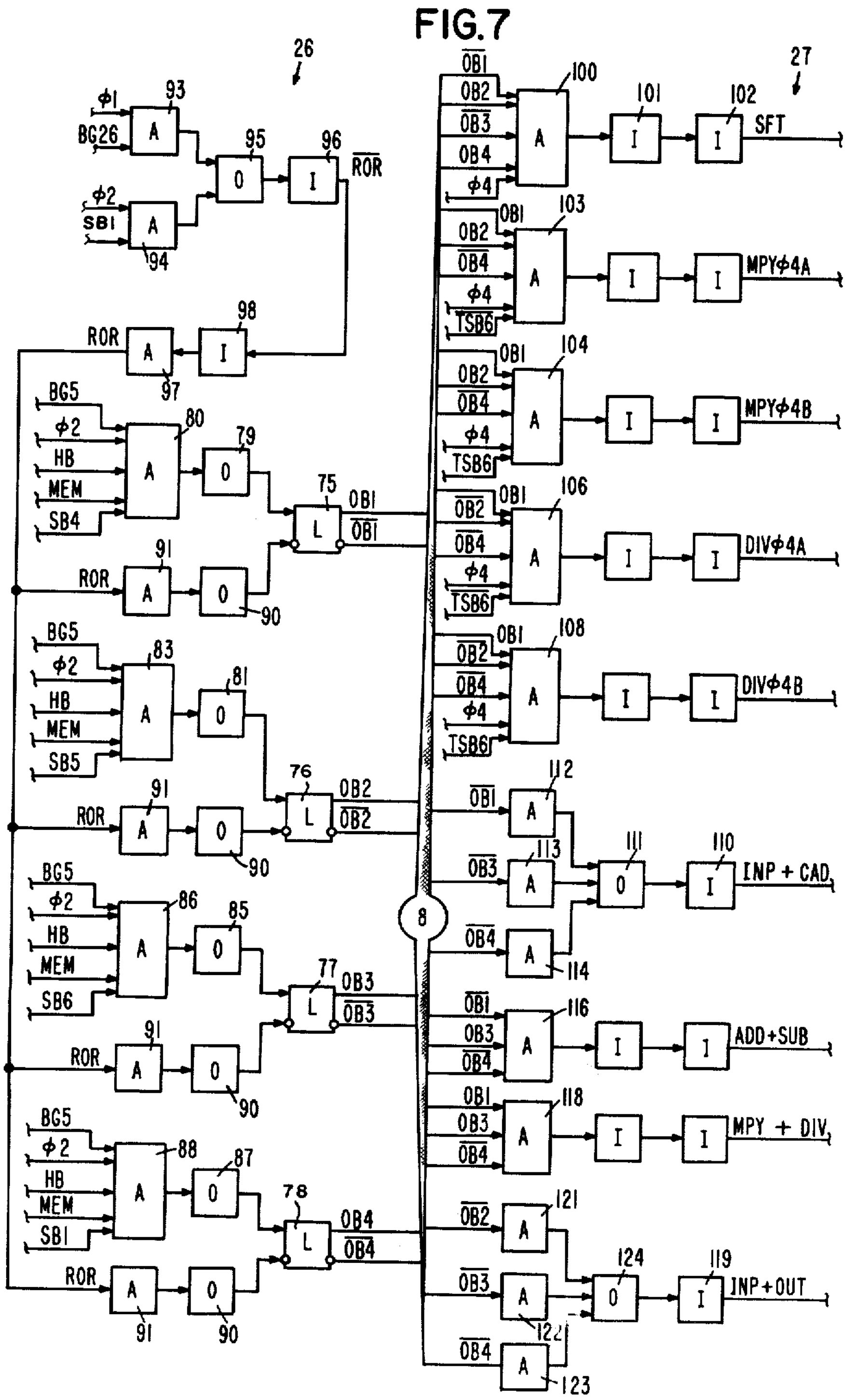
FIGURE 7 is a logical diagram of the operation register and operation decoder.
Figure 8:
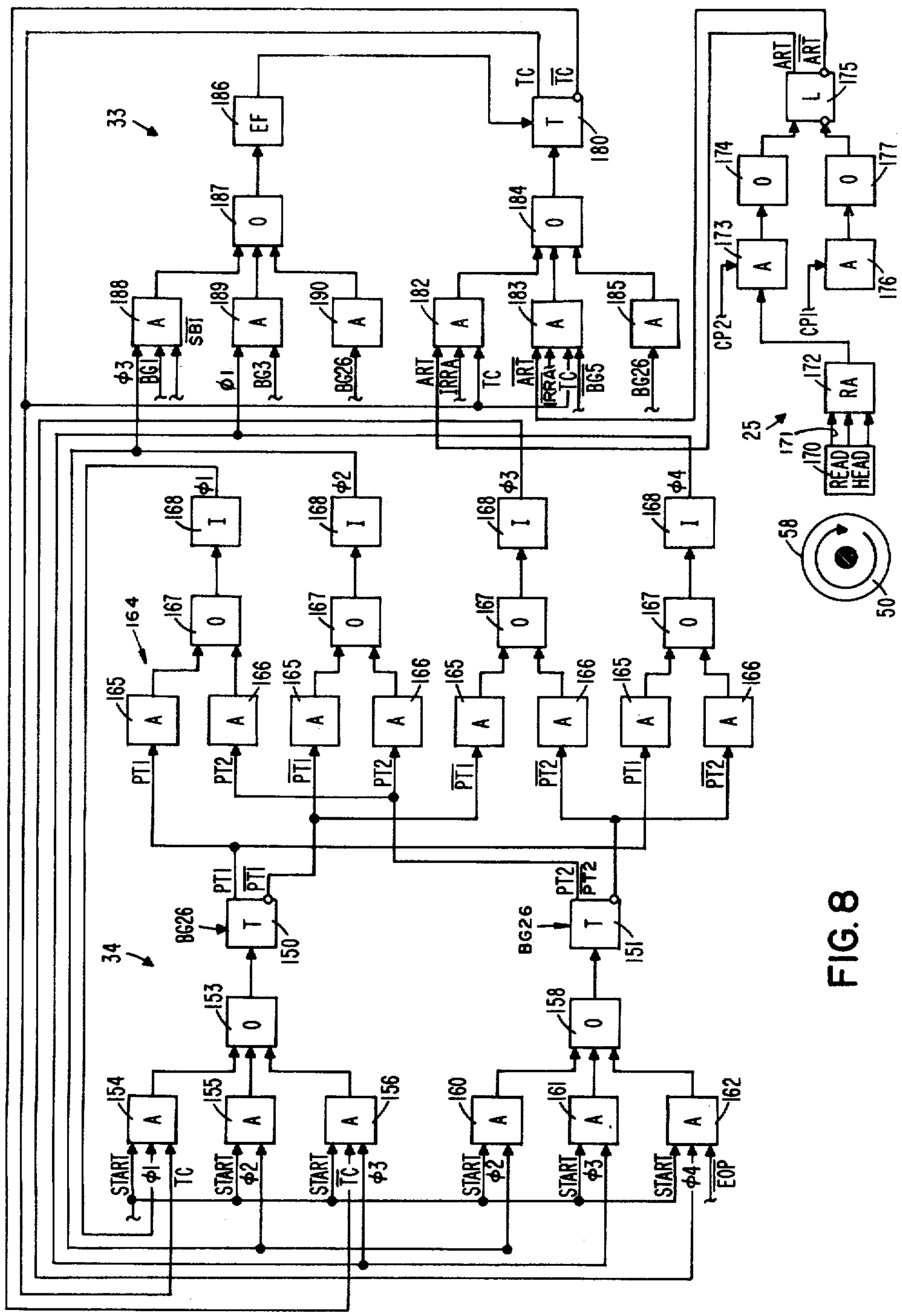
FIGURE 8 is a logical diagram of the phase control, word time comparator and word time generator.
Figure 10:
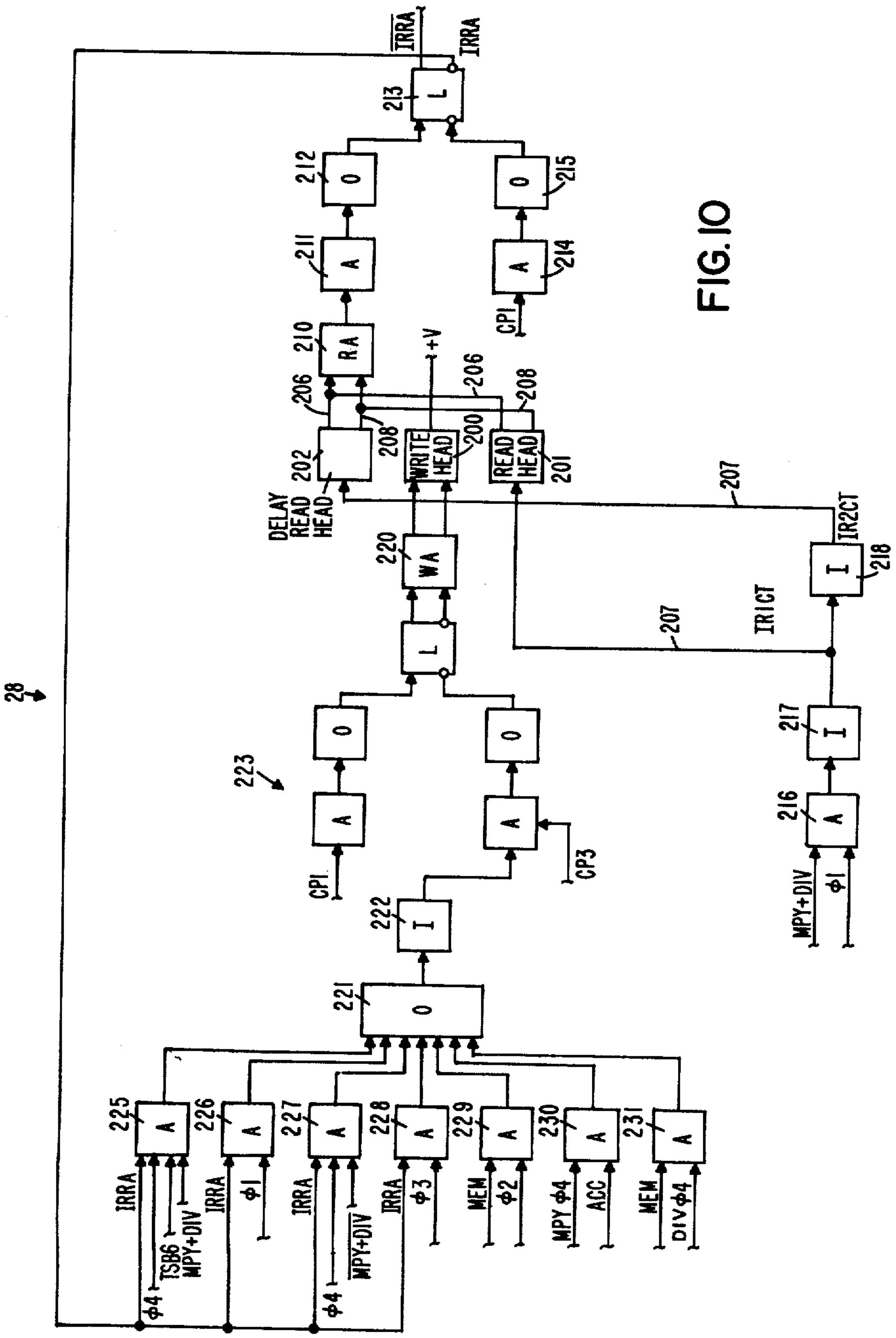
FIGURE 10 is a logical diagram of the instruction and multiplicand-divisor register.
Figure 11:
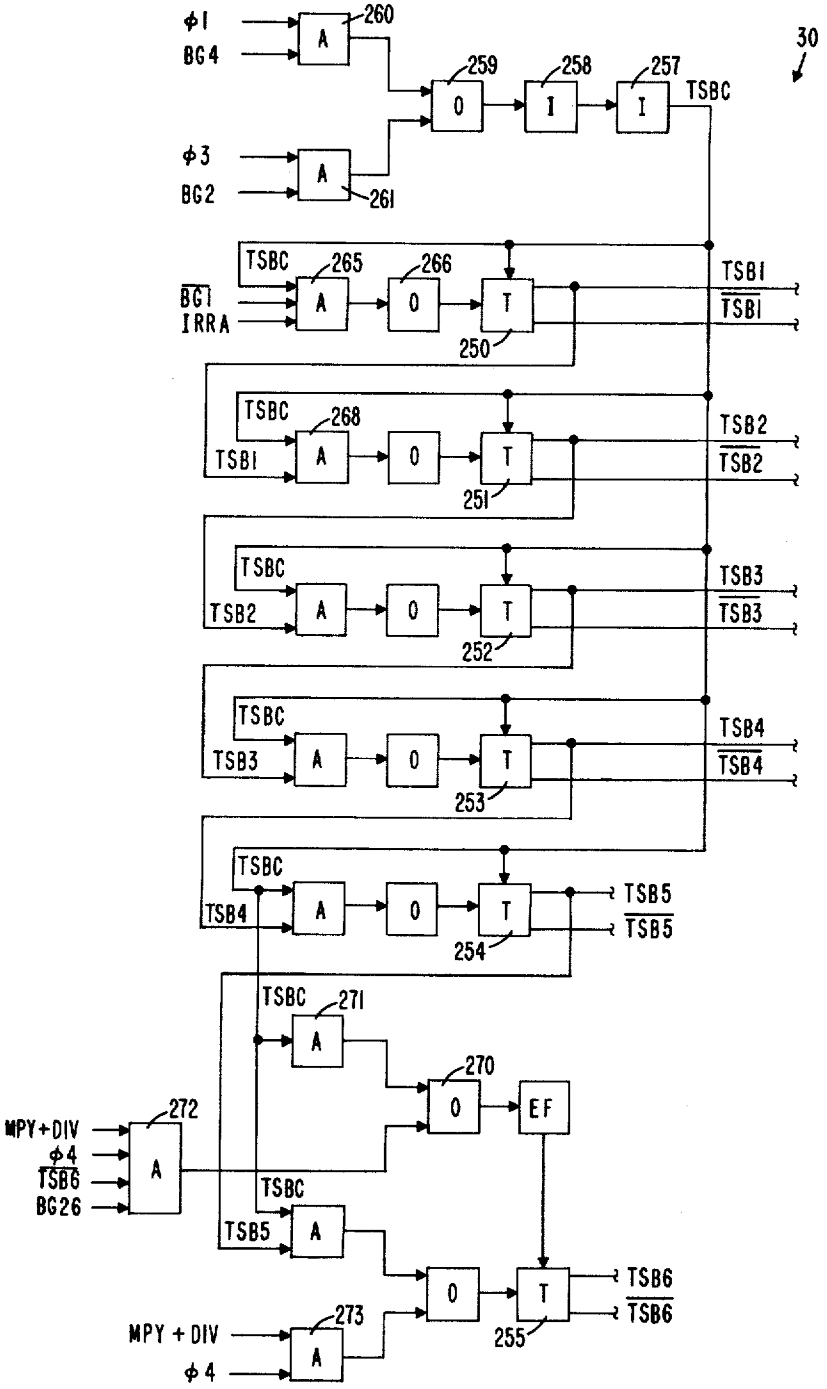
FIGURE 11 is a logical diagram of the track address register.

The timing circuits 13 are adapted to supply timing pulses to all portions of the computer. These various timing pulses are shown in FIGURES 5 and 6 of the drawings. FIGURE 5 depicts the occurrence of the clock pulses CP1 and CP4, the half bit timing pulse HB and the home timing pulse HP with respect to the bit positions B1–B26 representing one instruction word. In effect, each of the bit positions is directly related to a time interval since the magnetic drum 50 is rotating at a constant speed. The CP1 signal provides a positive pulse at the begining of each and every bit time during the operation of the computer. At the end of each timing pulse CP1 a positive timing pulse CP2 occurs and the same relationship is maintained between the timing pulses CP2–CP3 and CP3–CP4. It will be noted that one of each of the timing pulses CP1–CP4 occur during each bit time. The half bit or HB timing signal provides a positive pulse each bit time. The half bit pulse occurs in the middle portion of each bit time and lasts for half of the associated bit time. The home pulse HP occurs during bit time B1 of each word time.

In FIGURE 6 of the drawings the timing pulses SB1–SB6 are shown. The SB1 signal is positive during bit time B1 and each succeeding sixth bit time. Thus, the SB1 signal is at a positive level during bit times B1, B7, B13, B19 and B25 of each word time. The above sequence is also applicable to the timing pulses SB2–SB6 with the exception that the first SB2 pulse occurs in bit time B2, the first SB3 pulse occurs in bit time B3, etc. It will be noted that the pulses SB1 and SB2 occur during bit positions B25 and B26 of a first word time and during bit positions B1 and B2 of a second and succeeding word time.

The timing signals BG1–BG5 represent certain bit gates. The timing signal BG1 is positive during bit times B1–B4 and it will be noted from FIGURE 4 of the drawings that this corresponds to those bits of an instruction word containing information concerning the word position of the operand and the switching data. The signal BG2 occurs during bit times B5–B9 and the information in an instruction word located at these bit positions defines the track address of the operand. Bit gates BG3 and BG4 each are at a positive level for six bit times (B10–B15 and B16–B21) and occur in bit positions or times corresponding to the word time and track location contained in the next instruction address portion of an instruction word. The remaining bit gate timing pulse BG5 is at a positive level during bit times B22–B26. These bit times define the operation and parity information contained in an instruction word.

Also shown in FIGURE 6 of the drawings is the timing signal $\overline{BG2}$ which is the inverse of the signal BG2. In other words, the $\overline{BG2}$ signal is always positive except during bit times B5–B9 during each word time. When the BG2 signal is at its positive level the $\overline{BG2}$ signal is at the zero potential level. The inverse of all timing pulses is available to the various portions of the computer although only one such inverted timing signal has been shown.

The above-described timing pulses are sufficient to provide a means for defining a resultant timing pulse which defines any particular bit time or series of bit times in a word time or length. The various timing pulses may be combined with the use of logical And or Or blocks to accomplish this result. For convenience in the following portions of the specification, the combined timing signals are designated by the letter G followed by a numeral. For example, the signal G1 is at the binary one level only during bit time one of each word time. The logic circuitry for providing the various G timing signals will not be described.

Any apparatus well-known to those skilled in the art may be employed for generating the timing signals or pulses. It is preferred that the generation of the timing signals be synchronized with the rotation of the magnetic drum. A bit gate generator of a type which may be employed for this purpose is described in the co-pending U.S. patent application of Gene J. Cour, Serial No. 745,-194, filed June 27, 1958, now U.S. Patent No. 3,017,627, entitled "Bit Gate Generator," which is assigned to the assignee of the present invention.

DETAILED DESCRIPTION

The various portions of the data processing apparatus which require further explanation are more fully described in the following portion of the specification. A typical multiplication operation will be described to show the use of the instruction and multiplicand-divisor register 28 on a time shared basis between major functional units of the computer to temporarily store and periodically make available information quantities which are used in different phases of a computational cycle of the computer.

OPERATION REGISTER

The operation register 26 receives the information contained in bit positions B22–B25 of an instruction word and is operative to temporarily store this data during certain portions of a computational cycle of the computer. The operation portion of an instruction word is supplied to the operation register during Phase II of a computational cycle when the new instruction word is transferred from the memory to the instruction and multiplicand-divisor register 28. The four bits of information in the operation portion of an instruction word are retained or stored in the operation register for a time period extending from Phase II until the end of Phase I in the following computational cycle.

The operation register 26 comprises essentially four latches 75–78 which are capable of performing a storage function. The set input of the latch 75 is connected to the output of an Or block 79 whose input comes from the And block 80. The various inputs to the And block 80 are the timing signals BG5, HB and SB4, a signal MEM coming from a read amplifier of the read circuits 22 associated with the magnetic storage means 20 and a signal $\phi 2$ generated in the phase control 34 of the program control for the computer. The signal $\phi 2$, as will be hereinafter more fully explained, is at the binary one level during Phase II of a computational cycle whereby the And block 80 may be enabled during this phase. The timing signals BG5, HB and SB4 define a portion of the bit time B22. The latch 75 is responsive to the first bit of the operation portion of an instruction word supplied from the memory to the operation register by the signal MEM.

The set input of the latch 76 is driven by the output of the series connected Or block 81 and And block 83. The inputs to And block 83 are the same as the inputs to And block 80 with the exception that the timing pulses BG5, HB and SB define a portion of bit time B23 whereby the second information bit of the operation portion of an instruction word is stored in the latch 76. In a similar manner, the set inputs of latches 77 and 78 are driven by series connected Or and And blocks 85–86, 87–88, respectively. The timing signals supplied to the latches 77 and 78 are such that during Phase II of a computational cycle the information in bit positions B24 and B25 of an instruction word are stored in these latches.

The reset input of each of the latches 75–78 is actuated by a reset operation signal ROR that is applied through Or block 90 and And block 91. The reset signal ROR is generated by supplying signals $\phi 1$ and BG26 to And block 93 and signals $\phi 2$ and SB1 to And block 94. The outputs of the And blocks 93 and 94 are transmitted through Or block 95 to an inverter 96. The output of inverter 96 is the inverse of the reset signal ($\overline{ROR}$) and is passed to And block 97 and inverter 98. The latches 75–78 are reset during the last bit time of each word time in Phase I of a computational cycle and during the first bit time of the word time defining Phase II of a computational cycle. Phase I can last from one to sixty-four word times while Phase II extends for only one word time during all computational cycles of the computer.

The outputs of the latches 75–78 serve as inputs to the operation decoder 27. For convenience of description and explanation the output signals of each of these latches is designated by the reference symbols OB or $\overline{OB}$ followed by an appropriate numeral. For example, the outputs of the latch 75 are the signals OB1 and $\overline{OB1}$. When bit position B22 of the operation portion of an instruction word contains a one, the signal OB1 will be at the binary one level. Conversely, when bit position B22 contains a zero, the output signal $\overline{OB1}$ will be at the binary one level and the signal OB1 will be at the binary zero level.

OPERATION DECODER

The operation decoder 27 performs a translating function in that it takes the various output signals from the latches 75–78 of the operation register 26 and properly combines the same to provide the instruction signals listed in Table 1. In essence, the operation decoder comprises a series of And blocks for combining the output signals from the operation register and other timing signals.

A shift instruction signal SFT is provided by supplying the output signals $\overline{OB1}$, OB2, $\overline{OB3}$ and OB4 along with a phase control signal $\phi$4 to an And block 100. The phase control signal $\phi$4 is at the binary one level during Phase IV of a computational cycle of the computer. The output of And block 100 is passed through inverters 101 and 102 to provide the shift instruction signal SFT. The signal SFT will be at a positive level when the latches 75 and 77 have not changed their states and the latches 76 and 78 have changed states in response to the operation portion of an instruction word. This corresponds to binary zero's in bit positions B22 and B24 and binary one's in bit positions B23 and B25 as set forth in Table 1 above.

The operation decoder also provides four output signals which are not considered instruction signals as such but rather are used internally within the arithmetic units of the computer during Phase IV of a computational cycle. These signals are MPY$\phi$4A, MPY$\phi$4B, DIV$\phi$4A and DIV$\phi$4B. The signals MPY$\phi$4A and MPY$\phi$4B are provided by And blocks 103 and 104 which each receive the signals OB1, OB2 $\overline{OB4}$ and $\phi$4. In addition, And block 103 is supplied with the timing signal $\overline{TSB6}$ while And block 104 receives timing signal TSB6. These latter signals are generated in the track address register 30 as will be further explained.

In a similar manner the signal DIV$\phi$4A is provided by combining the signals OB1, $\overline{OB2}$, $\overline{OB4}$, $\phi$4 and $\overline{TSB6}$ in And block 106 while the signal DIV$\phi$4B is defined by the output of And block 108 whose inputs are the signals OB1, $\overline{OB2}$, $\overline{OB4}$ $\phi$4 and TSB6. The signals MPY$\phi$4 and DIV$\phi$4 have been divided into A and B portions for convenience in the arithmetic units of the computer. As mentioned, these signals are not instruction signals in the true sense but rather are control signals employed during multiply and divide operations of a computational cycle.

A combined instruction signal INP+CAD is supplied by the output of an inverter 110 whose input comes from Or block 111. The Or block 111 receives the signals $\overline{OB1}$, $\overline{OB3}$ and OB4 which are passed through And blocks 112–114, respectively. The INP+CAD signal is a combined signal comprising the instruction signals INP and CAD. These two instruction signals are easily segregated where necessary by appropriate gating at the point of use within the computer.

A signal ADD+SUB is provided by supplying the signals $\overline{OB1}$, OB3 and $\overline{OB4}$ to an And block 116. The signals OB1, OB3 and $\overline{OB4}$ are combined in And block 118 to provide control signal MPY+DIV. The output of an inverter 119 defines a combined instruction signal INP+OUT. The inverter 119 is driven by the signals $\overline{OB2}$, $\overline{OB3}$ and $\overline{OB4}$ which are passed to And blocks 121–123 and Or block 124.

Certain of the instruction signals listed in Table 1, such as the control transfer CTR and the store STO, are not provided by the operation decoder 27. The instances or number of times these signals are employed throughout the computer does not justify a centralized decoding circuit arrangement therefor. In those instances where the instruction signals STO or CTR are required, the necessary output signals of the latches 75–78 are combined in a proper manner at the point of use. This approach, as well as the combining of certain of the instruction signals, is taken to minimize the number of logic elements and circuit components employed in the computer.

The instruction signals are employed throughout other portions of the computer to condition such portions for the operation desired. For example, the proper combinations of digital information in the operation portion of an instruction word will correspond to a multiply operation and the resultant instruction signals MPY+DIV, MPY$\phi$4A and MPY$\phi$4B will properly condition all necessary elements of the computer for the multiply operation during Phase IV of a computational cycle.

PHASE CONTROL

The phase control 34 is operative to generate signals for shifting the computer between various phases of a computational cycle. The main components of the phase control are a pair of triggers 150 and 151. The four output signals of the pair of triggers are combined to define the phase control signals $\phi$1, $\phi$2, $\phi$3 and $\phi$4. Each of the phase control signals is at the binary one level during its associated phase of the computational cycle of the computer.

The input to the trigger 150 is supplied by Or block 153 whose various inputs come from the And blocks 154–156. The signals START, $\phi$1 and TC are combined in the And block 154. The signal START is essentially a timing signal which is at the binary one level throughout a computational cycle of the computer. The signal TC is supplied to the phase control from the word time comparator 33 and is at a positive level during the entire word time when coincidence is obtained between the signals indicating the word location of the new instruction word from the instruction and multiplicand-divisor register 28 and the coded signals from the word time generator 25. The generation of the time compare signal TC and the construction of the word time comparator 33 will be described in following portions of the specification. The inputs to the And block 155 are the signal START and phase control signal $\phi$2. The And block 156 combines the signals $\phi$3, $\overline{TC}$ and START to provide one input to the Or block 153.

The trigger 151 is driven in response to the output of Or block 158. The three inputs to Or block 158 come from And blocks 160–162. And block 160 is supplied with the signals $\phi$2 and START while And block 161 receives the signals $\phi$3 and START. The remaining And block 162 is enabled when the signals START, $\phi$4 and $\overline{EOP}$ are present. The signal EOP is a timing signal generated externally of the phase control which signifies the end of an operation.

The triggers 150 and 151 each have their inhibit inputs connected with the source of the timing signal BG26. The triggers cannot change state unless the inhibit inputs thereof are raised to the binary one level. The arrangement is such that the triggers 150 and 151 can change their states in response to the signals from the associated Or blocks 153 and 158 only during the last bit time B26 of any word time.

The outputs of the triggers 150 and 151 are designated by the symbols PT1–$\overline{PT1}$ and PT2–$\overline{PT2}$, respectively. These output signals are supplied to a decoding network 164 that combines the same in a proper manner to provide the signals $\phi$1–$\phi$4. Each section of the decoding network 164 includes a pair of And blocks 165 and 166, an Or block 167 and an inverter 168. The various combinations of the outputs of the triggers 150 and 151 defining the phase control signals $\phi$1–$\phi$4 are tabulated below.

*Table 3*

| Phase Control Signal | Outputs of Triggers 150 and 151 | | | |
|---|---|---|---|---|
| | PT1 | $\overline{PT1}$ | PT2 | $\overline{PT2}$ |
| $\phi$1 | 1 | 0 | 1 | 0 |
| $\phi$2 | 0 | 1 | 1 | 0 |
| $\phi$3 | 0 | 1 | 0 | 1 |
| $\phi$4 | 1 | 0 | 0 | 1 |

Considering now the operation of the phase generator, it will be assumed that initially the triggers 150 and 151 are both in their set states whereby the signals PT1 and PT2 are at the one level. It will also be assumed that the signal START is present and being supplied to the And blocks 154–156 and 160–162. At this time the computer is in Phase I of its computational cycle and the phase control signal $\phi 1$ is positive. Due to the use of the inverter 168, the signal $\phi 1$ is actually defined as the absence of binary one's in the signals $\overline{PT1}$ and $\overline{PT2}$.

During Phase I of the computational cycle of the computer, the memory is being searched for a new instruction word. The particular track location of a new instruction word is defined by bit positions B10–B15 of an instruction word and this information is placed in the track address register 30. The track address decoder 31 energizes the appropriate read circuits 22. The information contained in bit positions B10–B15 of an instruction word is compared by word time comparator 33 with the information or code supplied from the word time generator 25. When coincidence is detected by the word time comparator 33, the signal TC remains at the binary one level whereby the And block 154 is enabled. At the next bit time B26 when the signal BG26 is positive, the trigger 150 will change states so that the signal $\overline{PT1}$ is now at the binary one level. The phase control signal $\phi 1$ returns to the binary zero level to end Phase I of the computational cycle and the And block 154 is de-energized.

The signal $\phi 2$ immediately goes to the binary one level since the $\overline{PT1}$ and PT2 outputs of the triggers 150 and 151 are at the binary one level. The signal $\phi 2$ enables And block 155 whereby the output $\overline{PT1}$ is maintained at the binary one level during Phase II of a computational cycle. The And block 160 is also enabled by the phase control signal $\phi 2$ so that at the next bit time B26 the trigger 151 changes states. The signal $\overline{PT2}$ is now at the binary one level which causes the signal $\phi 2$ to drop off and the signal $\phi 3$ to become positive. Phase II of the computational cycle lasts for one word time during which the new instruction word is loaded into the instruction and multiplicand-divisor register 28.

Phase III may last from one to nine word times and the trigger 151 is maintained in its present state during this period by the output of And block 161. Phase III lasts until the signal $\overline{TC}$ from the word time comparator 33 goes to the binary zero level. This indicates that coincidence has been detected between the output of the word time generator 25 and information in bit positions B2–B4 of the new instruction word indicating the word location of the operand. The signal TC remains at the binary one level throughout the last word time of Phase III and the And block 156 is de-energized. During the following bit time B26 the trigger 150 changes states whereby the signal PT1 now represents a binary one. The signal $\phi 4$ immediately becomes positive while the signal $\phi 3$ returns to the level corresponding to the binary zero.

During Phase IV of a computational cycle the trigger 151 is maintained in its present state (the signal $\overline{PT2}$ at the binary one level). Phase IV will last one word time for all operations except multiply and divide operations which require twenty additional word times. At the end of Phase IV the end of operation signal $\overline{EOP}$ returns to the binary one level which enables the And block 162 and causes the trigger 151 to change to the other of its states. The signal PT2 is raised to the positive level whereby the phase control signal $\phi 4$ returns to the binary zero level. The phase control signal $\phi 1$ goes to the binary one level and the various elements of the computer are conditioned for Phase I of the succeeding computational cycle providing, of course, that the signal START is present.

WORD TIME GENERATOR

The word time generator 25 is adapted to generate output signals in coded form corresponding to the word times or lengths for each rotation of the magnetic drum 50. The output of the word time generator is supplied to the word time comparator 33 for comparison with the information in various portions of an instruction word contained in the instruction and multiplicand-divisor register 28.

The word time comparator comprises the address reference track 58 on the magnetic drum 50. As previously explained, each of the tracks on the magnetic drum is divided into sixty-four word times of equal length. The address reference track 58 has a binary code written in certain bit positions of each word time thereof. These bit positions correspond to the word location information in the operand address and next instruction address portions of an instruction word. The bit locations indicating the word location of the operand are contained in bit positions B2–B4 of the operand address portion while the word location of the next instruction word is contained in bit positions B10–B15 of the next instruction address portion of an instruction word. The particular code recorded on the address reference track 58 is set forth in Table 4 below.

*Table 4*

| Word Time | Bit Position | | | | | | | | | | | |
|---|---|---|---|---|---|---|---|---|---|---|---|---|
| | 2 | 3 | 4 | 5 | 6 | 7 | 10 | 11 | 12 | 13 | 14 | 15 |
| 0 | 0 | 0 | 0 | 0 | 0 | 0 | 0 | 0 | 0 | 0 | 0 | 0 |
| 1 | 1 | 0 | 0 | 0 | 0 | 0 | 1 | 0 | 0 | 0 | 0 | 0 |
| 2 | 0 | 1 | 0 | 0 | 0 | 0 | 0 | 1 | 0 | 0 | 0 | 0 |
| 3 | 1 | 1 | 0 | 0 | 0 | 0 | 1 | 1 | 0 | 0 | 0 | 0 |
| . | . | . | . | . | . | . | . | . | . | . | . | . |
| . | . | . | . | . | . | . | . | . | . | . | . | . |
| . | . | . | . | . | . | . | . | . | . | . | . | . |
| 63 | 1 | 1 | 1 | 1 | 1 | 1 | 1 | 1 | 1 | 1 | 1 | 1 |

The code recorded in bit positions B2–B7 and B10–B15 of the address reference track is essentially a binary count from zero to sixty-three which corresponds to the sixty-four word times on each track of a magnetic drum.

A read head 170 is positioned in transducing relation with respect to the address reference track 58 and the three conductors 171 leading therefrom are connected to a read amplifier 172. The output of the read amplifier 172 is combined with clock pulse CP2 in And block 173 and the resultant signal passes through Or block 174 to the set input of a latch 175. The latch 175 is reset each bit time by clock pulse CP1 which passes through the series connected And block 176 and Or block 177. The arrangement is such that the output signals ART and $\overline{ART}$ correspond to the information contained on the address reference track 58. The timing pulses CP2 and CP1 and the logic circuitry comprising the elements 173–177 provide a properly shaped pulse output for each binary one recorded on the address reference track.

WORD TIME COMPARATOR

The word time comparator 33 comprises a trigger 180 and associated input and inhibit gating means. The input gating means comprises And blocks 182 and 183 whose outputs are passed through an Or block 184. The inputs to the And block 182 are the signals ART, IRRA and TC while the inputs to the And block 183 are the signals $\overline{ART}$, $\overline{IRRA}$, TC and $\overline{BG5}$. The signals ART and $\overline{ART}$ come from the word time generator 25 while the signal TC is supplied from the output of the trigger 180. The signals IRRA and $\overline{IRRA}$ come from the instruction and multiplicand-divisor register 28 and comprise binary signals corresponding to the instruction word temporarily stored in this register. The timing signal BG26 is also transmitted to the trigger 180 via And block 185 and Or block 184.

The output signal TC of trigger 180 will remain at the binary one level as long as the same binary information appears in the same bit positions of the digital quantities coming from the word time generator and the instruction and multiplicand-divisor register. The And block 182 is enabled when binary one's are present while the And block 183 is enabled when binary zero's are evidenced in the same bit positions of the instruction word and the word location code. When the signals ART–IRRA or $\overline{\text{ART–IRRA}}$ are at different voltage levels during the same bit time, the trigger 180 wil change its state and the signal $\overline{\text{TC}}$ will go to the binary one level. The signal TC drops off whereby the And blocks 182 and 183 cannot thereafter be energized and the signal $\overline{\text{TC}}$ will remain until the trigger is again set. The presence of the signal $\overline{\text{TC}}$ from the trigger 180 indicates that the word time location of the desired new instruction word or operand has not been found. The trigger 180 is set each word time at bit time B26 whereby at the beginning of the succeeding word time the signal TC is at the binary one level.

The inhibit input of trigger 180 is connected to suitable gating means which comprises an emitter follower 186, Or block 187 and a plurality of And blocks 188–190. The inputs to the And block 189 are the timing signals $\phi 1$ and BG3 whereby the inhibit input of trigger 180 is raised to the binary one level during bit times B10–B15 of Phase I of a computational cycle. This time interval corresponds to the bit positions of an instruction word which contain the word time location of the new instruction word.

The inputs to And block 188 comprise the phase control signal $\phi 3$ and the timing signal BG1 and $\overline{\text{SB1}}$ whereby inhibit input of trigger 180 is at the binary one level during bit times B2–B4 of each word time. The inhibit input of the trigger 180 is at a positive voltage level during bit time B26 of each word time whereby the trigger may be set by the signal from And block 185 during this time interval.

The trigger 180 is adapted to change states whenever the word location information contained in an instruction word temporarily stored in the instruction and multiplicand-divisor register 28 does not correspond exactly with the information indicating the present word time location of the rotating magnetic drum as supplied by the word time generator 25. An instruction word employs only three bit positions (B2–B4) to indicate the word time location of the operand while six bit positions (B10–B15) of the next instruction address portion of an instruction word contain the information as to the word time location of the new instruction word. Since only three bit positions in an instruction word designate the word time location of the operand, the position of the operand on a track of the magnetic drum is limited to eight possible locations. The maximum time required to locate the operand during Phase III of a computational cycle is nine word times while a maximum of sixty-four word times may be required to locate the new instruction word during Phase I of a computation cycle.

In the event that the information from the word time generator and the instruction and multiplicand-divisor register corresponds during bit time B2–B4, the signal TC of trigger 180 will remain at the binary one level and And block 154 in the phase control 34 will be enabled to begin Phase II of the computational cycle at the start of the next word time. The signal TC will also be at the binary one level throughout the last word time of Phase III of a computational cycle when coincidence has been detected between the information in bit positions B10–B15 of the instruction word in the instruction and multiplicand-divisor register 28 and the coded word location signals supplied by the word time generator 25. The And block 156 is not energized and Phase IV of the computational cycle begins at the start of the next word time.

INSTRUCTION AND MULTIPLICAND-DIVISOR REGISTER

Figure 9:
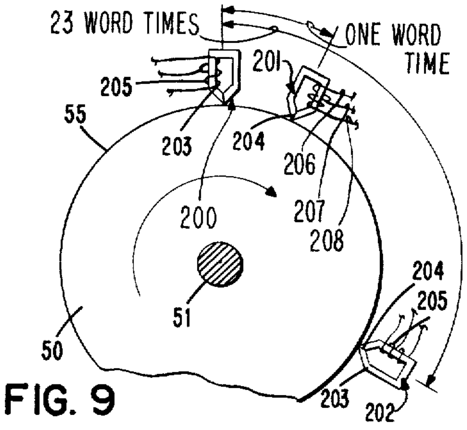
FIGURE 9 is a side sectional view of the magnetic drum showing particularly the instruction and multiplicand-divisor register.

As shown in FIGURE 9 of the drawings, the instruction and multiplicand-divisor register 28 comprises a track 55 on the magnetic drum 50. Associated in transducing relation with the track 55 are a write head 200, a read head 201 and a delay read head 202. The write head 200 and the read head 201 are spaced along the track 55 by a distance equal to one word time and define a one word revolver. The delay read head 202 is spaced from the write 200 by a distance equal to twenty-three word times whereby information recorded by the write head is available at the delay read head twenty-three word times thereafter.

The instruction and multiplicand-divisor register is employed on a time shared basis between the program control and the arithmetic units of the computer during multiply and divide operations. An instruction word is recorded by the write head 200 on the track 55 during Phase II of a computational cycle. Throughout Phase III of a computational cycle the instruction word is sensed or retrieved each word time by the read head 201 and supplied to the word time comparator 33 and the write head 200 for recording on the track 55.

In a multiply or divide operation the multiplicand or divisor is transmitted to the write head 200 and recorded on the track 55 during the first word time of Phase IV. During the remaining word times of Phase IV for a multiply or divide operation the multiplicand or divisor is sensed by the read head 201 once each word time and supplied to the added-subtractor 40 of the arithmetic units and the write head 200 for recording on the magnetic track 55. Phase IV of a computational cycle for a multiply or divide operation ends twenty-three word times after the start thereof and the instruction word is sensed by the relay read head 202 and returned to the write head 200 for recording on the track 55. The instruction word is available once each word time during Phase I of the succeeding computational cycle when the new instruction word is being located.

The read head 201 and the delay read head 202 each comprises a core of magnetic material 203 with a suitable gap 204 therein. A center tapped sensing coil 205 is disposed about each of the cores and the output conductors thereof are designated by the reference numerals 206, 207 and 208. The output conductors 206 and 208 of the read head 201 and the delay read head 202 are directly connected to a read amplifier 210. The read amplifier is connected by And block 211 and Or block 212 to the set input of a latch 213. The latch 213 is reset at the beginning of each bit time by timing pulse CP1 which is passed through And block 214 and Or block 215. The output signals of the latch are designated as IRRA and $\overline{\text{IRRA}}$.

The output signals IRRA and $\overline{\text{IRRA}}$ will correspond to either the information sensed by the read head 201 or the information sensed by the delay read head 202 depending upon which of these read heads has a positive voltage signal impressed on the center tap conductor 207 thereof. When the conductor 207 associated with the delay read head 202 is at a positive voltage level with respect to the conductor 207 of the read head 201, the outputs of the latch 213 will correspond to the information sensed by the delay read head 202. Conversely, a positive voltage level on the conductor 207 of read head 201 will result in output signals from the latch 213 that correspond to the information retrieved by the read head 201.

The signal IR1CT, which is supplied to the conductor 207 of read head 201, is provided by combining the phase control signal $\phi 1$ and the instruction control signal MPY+DIV in an And block 216 and passing the output thereof through an inverter 217. The output of the inverter 217 is transmitted through a second inverter 218 to define the signal IR2CT which appears on the conductor 207 of the delay read head 202. The arrangement is such that the output signals IRRA and $\overline{\text{IRRA}}$ of the latch 213 correspond to the information sensed by the read head 201 at all times except during Phase I of a computational cycle following a multiply or divide operation.

The signals IRRA and $\overline{IRRA}$ reflect the information sensed by the delay read head 202 only after a multiply or divide operation when it is necessary to place the instruction word in the one word revolver defined by write head 200 and read head 201 for locating the new instruction word during Phase I of the following computational cycle.

Two conductors of the write head 200 are connected to a write amplifier 220 while the center conductor is tied to a positive terminal of a direct current voltage source. The write amplifier 220 receives the output signals of series connected Or block 221 and inverter 222 which are passed through logic circuitry 223. The information coming from Or block 221 and inverter 222 is recorded on the track 55 of the magnetic drum by the write head 200.

The inputs to the Or block 221 are supplied by And blocks 225–231. The And block 225 combines the signal IRRA from latch 213, the phase control signal $\phi 4$, the combined instruction control signal MPY+DIV and the signal TSB6 from the track address register 30. The And block 225 is enabled during Phase IV of a multiply or divide operation except during the first word time thereof. The information sensed by the read head 201 is being supplied to the And block 225 during this time interval. The And block 226 receives the phase control signal $\phi 1$ and the output signal IRRA from latch 213. This And block provides the circuit means interconnecting the read head 201 and the write head 200 during Phase I of a computational cycle to define a one word revolver.

The And block 227 is enabled by the signals $\overline{MPY+DIV}$, $\phi 4$ and IRRA. When an operation other than a multiply or divide is being performed (as indicated by the signal $\overline{MPY+DIV}$), the information sensed by read head 201 is recorded on the track 55 by write head 200 during Phase IV of a computational cycle. The And block 228 combines the signals IRRA and $\phi 3$ so that the read head 201 and the write head 200 define a one word revolver during Phase III of a computational cycle.

During Phase II of a computational cycle it is necessary to load a new instruction word into the instruction and multiplicand-divisor register. This is accomplished by supplying the phase control signal $\phi 2$ and the signal MEM from the read circuits 22 of the memory to the And block 229.

When a multiply operation is being performed, the multiplicand, which is in the accumulator register 41 of the arithmetic units, is introduced into the instruction and multiplicand-divisor register during the first word time of Phase IV. The signals ACC and MPY$\phi 4$ are combined in And block 230 for this purpose. The signal ACC comes from the read head associated with the accumulator register 41. In a similar manner, the divisor is recorded on the track 55 by the write head 200 during the first word time of Phase IV for a divide operation. The divisor comes from the memory of the computer and is represented by the signal MEM which is combined with the signal DIV$\phi 4$ in And block 231.

The above-described arrangement is such that the output signal IRRA of latch 213 is supplied to the write head 200 at all times during a computational cycle except during Phase II when the new instruction word is loaded into the instruction and multiplicand-divisor register (And block 229) and the first word time of Phase IV of a multiply or divide operation when the multiplicand is transmitted to the read head from the accumulator or the divisor coming from the memory is recorded on the track 55 by write head 200 (And blocks 230 and 231). Although the write head 200 is connected with the output of the latch 213 during the major portion of a computational cycle, the signal IRRA represents information sensed by the read head 201 and the delay read head 202 during different portions of a computational cycle. The read head 201 is effectively connected with the write head 200 except during the first word time of Phase I of a computational cycle following a multiply or divide operation when the instruction word is read by the delay head 202 and supplied to the write head 200 for recording on the track 55.

TRACK ADDRESS REGISTER

The track address register 30 is adapted to receive the track location information contained in bit positions B5–B9 and B16–B21 of an instruction word in the instruction and multiplicand-divisor register 28. The outputs of the track address register 30 are supplied to a suitable decording network 31 which is operative to energize appropriate ones of the read circuits 22. The track address decoder 31 may take the same general form as the operation decoder 27 which has been previously described.

The track address register 30 is essentially a shift register formed from a plurality of triggers 250–255. Each of the triggers 250–255 corresponds to one bit of information occurring in the operand address portion or instruction address portion of an instruction word and indicating the track location of the desired data.

The inhibit input of each of the triggers 250–255 is supplied with a signal TSBC coming from series connected inverters 257 and 258. The inverter 258 is driven by the output of an Or block 259 whose inputs are supplied by And blocks 260 and 261. The phase control signal $\phi 1$ and the timing pulse BG4 define the inputs to the And block 260 whereby the inhibit input of each of the triggers is raised to a positive level during bit times B16–B21 of Phase I of a computational cycle. It will be noted from FIGURE 4 of the drawings that the information concerning the track location of the next instruction word is contained in these bit positions of an instruction word.

The track location of an operand is defined by bit positions B5–B9 of an instruction word and the phase control signal $\phi 3$ and timing pulse BG2 enable the And block 261 for a time interval corresponding to these bit positions. The inhibit inputs of triggers 250–255 are raised to the binary one level during Phase III of a computational cycle to permit the storage of information indicating the track address of the operand in the track address register.

The inhibit input to trigger 255 is supplied from Or block 270 whose inputs are the output signals of And blocks 271 and 272. The input to And block 271 is the signal TSBC while And block 272 combines the signals MPY+DIV, $\phi 4$, $\overline{TSB6}$ and BG26. The inhibit input of trigger 255 is raised to a positive level at the end of a first word time during Phase IV of a multiply or divide operation in addition to the above-defined bit times during Phase I and Phase III of a computational cycle.

The trigger 250 is driven by the output of series connected And block 265 and Or block 266. The And block 265 receives the signal TSBC from the inverter 257, the output signal IRRA of the instruction and multiplicand-divisor register 28 and the timing pulse $\overline{BG1}$. Trigger 250 is responsive to the track location information contained in an instruction word stored in the instruction and multiplicand-divisor register 28. The outputs TSB1 and $\overline{TSB1}$ of the trigger 250 are supplied to the track address decoder 31.

The input for the second trigger 251 comes from And block 268 which receives the signal TSBC and the output signal TSB1 from the trigger 250. In a similar manner, the remaining triggers 252–255 each have an And block supplying the input signal thereto which combines the signal TSBC with the output signal from the previous trigger stage. The arrangement is such that the digital information indicating the track location of an operand or new instruction word is received by the trigger 250 in a serial fashion and propagated through the remaining triggers of the track address register.

The track address register is essentially a shift register in that the information is shifted from trigger to trigger. The track location of the operand is defined by five bit positions of the instruction word (B5–B9) and only the first five stages of the track address register are required for temporarily storing this information. The outputs of the triggers are connected to the track address decoder 31 which in turn enables the appropriate ones of the read circuits 22 in accordance with the track location information stored in the track address register.

The trigger 255 also receives an input from And block 273 which combines the signals MPY+DIV and $\phi 4$ during Phase IV of multiply or divide operation. The signals TSB6 and $\overline{\text{TSB6}}$ are used for various timing purposes throughout the computer during Phase IV of a multiply or divide operation. During this time period, the signal $\overline{\text{TSB6}}$ will be at the binary one level during the first word time. At bit time twenty-six of the first word time the inhibit conductor will be raised to a positive level and the trigger 255 will change states. The signal TSB6 becomes positive and will remain at the binary one level throughout the remainder of Phase IV of a multiply or divide operation.

ARITHMETIC UNITS

The arithmetic units, as previously explained, comprise the adder-subtractor 40, the accumulator register 41, the multiplier-quotient register 42 and the sign register 43. The adder-subtractor is a full binary adder subtractor with carry borrow circuitry of a type well-known in the art. Examples of such adder-subtractors are to be found in Chapter 4 of the book entitled, "Arithmetic Operations in Digital Computers" by R. K. Richards, which was published by D. Van Nostrand Company, Inc., Princeton, New Jersey, in 1955, and in the above-identified Urquhart application.

The accumulator register includes a revolver, not shown, employing the track 57 on the magnetic drum. The spacing between the read and write heads of this revolver is equal to twenty-five bit times whereby during multiply operations a twenty-five bit delay is evidenced between the readout of the information from the adder-subtractor to the accumulator revolver and the return of this information to the adder-subtractor. This accomplishes a one bit shift during each word time as is necessary in a multiply operation. A delay means equal to two bit times is introduced between the read head of the accumulator revolver and the input to the adder-subtractor for a divide operation.

The multiplier-quotient register is similar to the accumulator register in that it comprises the track 56 on the magnetic drum and a pair of transducing heads spaced from each other by a distance equal to twenty-five bit times. The arrangement is such that the bits of the multiplier may be examined in a sequential manner to determine whether the multiplicand should be added to any partial product. As will be understood, the multiplicand will be added to the partial product if a binary one appears in the bit position of the multiplier being examined.

OPERATION

The overall operation of the data processing apparatus above described will perhaps be best understood by considering a multiply operation in detail. During Phase I the instruction word is in the instruction and multiplicand-divisor register 28 and is circulating between the read head 201 and the write head 200. The signal IRRA is also supplied to the word time comparator 33 and the track address register 30. When coincidence is detected by the word time comparator the phase control 34 shifts the computer into Phase II of a computational cycle.

Phase II lasts for one word time and the new instruction word is supplied from the memory to the write head 200 and recorded on the track 55. The new instruction is now temporarily stored in the instruction and multiplicand-divisor register 28.

The new operand—in this case the multiplier—is located during Phase III. The instruction word is read by the read head 201 and supplied to the write head 200, the word time comparator 33 and the track address register 30. When the location of the operand has been obtained the phase control shifts the computer into Phase IV.

The first word time of Phase IV is essentially devoted to the transfer of information to the proper functional units in the computer. The multiplicand in the accumulator register, as represented by the signal ACC, is supplied to the write head 200 while the multiplier from the memory is loaded into the multiplier-quotient register 42. The accumulator register is clear whereby the zero partial product is in fact zero.

The same operations are repeated for each of the remaining twenty-two word times of Phase IV and to avoid unnecessary repetition only the operations for one such word time will be described. The appropriate bit of the multiplier as, for example, the first bit position of the data word during word time two, is examined to determine whether this bit is a binary one or zero. If a one is detected in the multiplier, the multiplicand coming from the read head 201 of the instruction and multiplicand-divisor register 28 is added to the partial product coming from the accumulator. The partial product from the accumulator register is shifted one bit position since the accumulator revolver introduces a twenty-five bit delay into the system. If a zero is detected in the appropriate bit position of the multiplier, the adder-subtractor is gated in such a manner that zero's are added to the partial product coming from the accumulator revolver. The spacing between the read and write heads of the accumulator revolver again defines a shift of one bit position. After the multiplication has been performed, the final product will appear in the accumulator register, the signal $\overline{\text{EOP}}$ will go to the binary zero level and the phase control will shift the computer into Phase I.

During the first word time of the succeeding Phase I, the delay read head 202 is connected with the write head 200 whereby the previous instruction word is retrieved and written on the track 55. Thereafter the instruction word circulates in the revolver defined by the write head 200 and read head 201 until the new instruction word is located. As shown in FIGURE 9 of the drawings, the delay read head 202 is located twenty-three word times from the write head 200. The instruction word is immediately available at the delay read head 202 during Phase I of a succeeding computational cycle following a multiply or divide operation.

It should now be apparent that the above-described data processing apparatus provides a register for use on a time shared basis between major functional units of a computer wherein the stored information must be available periodically during certain phases of a computational cycle. The instruction and multiplicand-divisor register is highly simplified in that an additional track on the magnetic drum, a write head and ancillary read and write amplifiers are not required.

While the inveniton has been particularly shown and described with reference to a preferred embodiment thereof, it will be understood that various changes in form and details may be made therein without departing from the scope and spirit of the invention.

What is claimed is:

1. A register for temporarily storing information quantities comprising a magnetic drum, means to rotate said magnetic drum, a record track on said magnetic drum, a write head positioned in transducing relation with respect to track, a first read head positioned in transducing relation with respect to said track for sensing information quantities on said track and in spaced relation with respect to said write head in the direction of rotation of said drum, a second read head positioned in transducing relation with respect to said track for sensing information quantities on said track and in spaced relation with respect to said first read head in the direction of rotation of said drum, first circuit means interconnecting said write head and said first read head to cause a first quantity of information supplied to said write head to be sensed by said first read head and returned to said write head for recording on said track during a first time interval, means to supply a second quantity of information to said write head for recording by said write head on said track in immediately following relation with respect to said first quantity of information and to be periodically sensed by said first read head and returned to said write head for recording on said track during a second time interval, and second circuit means interconnecting said second read head to said write head to cause said first quantity of information sensed by said second read head at the end of said second time interval to be supplied to said write head for recording on said track and to be thereafter sensed by said first read head during a third time interval.

2. Apparatus according to claim 1 further characterized in that the spacing between said first read head and said second read head is greater than the spacing between said write head and said first read head.

3. A device for the storage of information quantities comprising a recording medium, a first transducing means positioned in transducing relation with respect to said recording medium, a second transducing means positioned in transducing relation with respect to said recording medium and in spaced relation with respect to said first transducing means, a third transducing means positioned in transducing relation with respect to said recording medium and in spaced relation with respect to said second transducing means, driving means for effecting relative movement between said recording medium and said transducing means, first circuit means interconnecting said first transducing means and said second transducing means to cause a first quantity of information supplied to said first transducing means to be sensed by said second transducing means and returned to said first transducing means for recording on said recording medium during a first time interval, means to supply a second quantity of information to said first transducing means for recording on said recording medium in following relation with respect to said first quantity of information and to be periodically sensed by said second transducing means and returned to said first transducing means for recording on said recording medium during a second time interval, and second circuit means interconnecting said first transducing means and said third transducing means to cause said first quantity of information sensed by said third transducing means after said second time interval to be suppied to said first transducing means for recording on said recording medium and to be thereafter sensed by said second transducing means during a third time interval.

4. Apparatus according to claim 3 further characterized in that the spacing between said first transducing means and said third transducing means is greater than the spacing between said first transducing means and said second transducing means.

5. A device for the temporary storage of information quantities comprising delay means having a plurality of points therealong, means to introduce information quantities into said delay means at a first point, first means to retrieve operably connected with said delay means at a second point for sensing information quantities in said delay means, second means to retrieve operably connected with said delay means at a third point for sensing information quantities in said delay means, means for supplying a first quantity of information to said means to introduce for entry into said delay means and sensing by said first means to retrieve during a first time interval, means for supplying a second quantity of information to said means to introduce for entry into said delay means in following relation with respect to said first quantity of information and sensing by said first means to retrieve and return to said means to introduce during a second time interval, and circuit means interconnecting said second means to retrieve and said means to introduce to cause said first quantity of information sensed by said second means to retrieve after said second time interval to be supplied to said means to introduce for re-entry into said time delay means and then sensed by said first means to retrieve during a third time interval.

6. Apparatus according to claim 5 further comprising circuit means interconnecting said first means to retrieve and said means to introduce, and said last-mentioned circuit means, said means to introduce and said first means to retrieve defining a revolver for the circulation of a quantity of information.

7. Apparatus according to claim 5 further characterized in that the delay of a quantity of information supplied to said means to introduce and sensed by said second means to retrieve is greater than the delay of a quantity of information supplied to said means to introduce and sensed by said first means to retrieve.

8. Data processing apparatus of the type adapted to perform mathematical computations with information quantities comprising a memory for the storage of instruction and operational information quantities, arithmetic units for manipulating said operational information quantities, a program control for receiving said instruction information quantities and controlling the operation of said arithmetic units, said arithmetic units and said program control comprising a common register, said register comprising delay means having a plurality of points located therealong, means to introduce information quantities into said delay means at a first point, means to supply information quantities to said means to introduce from said arithmetic units and said memory, a first means to retrieve operably connected with said delay means at a second point for sensing information quantities in said delay means, a second means to retrieve operably connected with said delay means at a third point for sensing information quantities in said delay means, means to supply information quantities from one of said means to retrieve to said means to introduce, said program control and said arithmetic units, and means to supply information quantities from the other of said means to retrieve to said means to introduce.

9. Apparatus according to claim 8 further characterized in that said means to introduce and said one of said means to retrieve define a revolver for the periodic circulation of information quantities.

10. Apparatus according to claim 8 further characterized in that said memory comprises a continuous and moving magnetic member having a plurality of tracks thereon, said delay means comprising one of said tracks, said means to introduce comprising a write head, and said first and second means to retrieve comprising read heads.

11. Data processing apparatus of the type adapted to perform computations comprising a memory for the storage of instructions and operational information quantities, a program control for controlling the operation of said arithmetic units in accordance with the instruction information quantities supplied thereto, said arithmetic units comprising an accumulator register and a multiplier-quotient register, said program control comprising an operation register, an instruction and multiplicand-divisor register common to said arithmetic units and said program control, said instruction and multiplicand-divisor register comprising delay means having a plurality of points located therealong, means to introduce an instruction information quantity from said memory into said delay means at a first point at the beginning of a first time interval, first means to retrieve positioned at a second point for sensing said instruction information quality in said delay means, first circuit means interconnecting said first means to retrieve and said means to introduce to cause said instruction information quantity to be returned to said means to introduce for entry into said delay means during said first time interval, means to supply an operational information quantity to said means to introduce for entry into said delay means in following relation with respect to said instruction information quantity, said operational information quantity being sensed by said first means to retrieve and return over said first circuit means to said means to introduce for entry into said delay means during said second time interval, second means to retrieve positioned at a third point for sensing said instruction information quantity after said second time interval, and second circuit means interconnecting said second means to retrieve and said means to introduce for entry of said instruction information quantity into said delay means after said second time interval and for sensing by said first means to retrieve.

12. Apparatus according to claim 11 further comprising phase control circuitry providing phase control signals for controlling the stages of a computation cycle, said means to introduce comprising a first And block combining one of said phase control signals and said instruction information quantity coming from said memory, and said means to supply comprising a second And block combining another of said phase control signals and said operational information quantity.

13. Apparatus according to claim 11 further comprising phase control circuitry providing phase control signals controlling the stages of a computation cycle, said first circuit means comprising an And block combining one of said phase control signals and the output of said first means to retrieve, and said second circuit means comprising an And block combining another of said phase control signals and the output of said second means to retrieve.

References Cited in the file of this patent

UNITED STATES PATENTS 2,927,732 Rinder et al. ------------ Mar. 8, 1960

OTHER REFERENCES

Moore et al.: "Serial Multiplying," IBM Technical Disclosure Bulletin, vol. 1, No. 3, October 1958.